Feb. 2, 1965     H. M. CRAWFORD     3,167,947
GAS DETECTOR AND ANALYZER
Filed Aug. 7, 1961
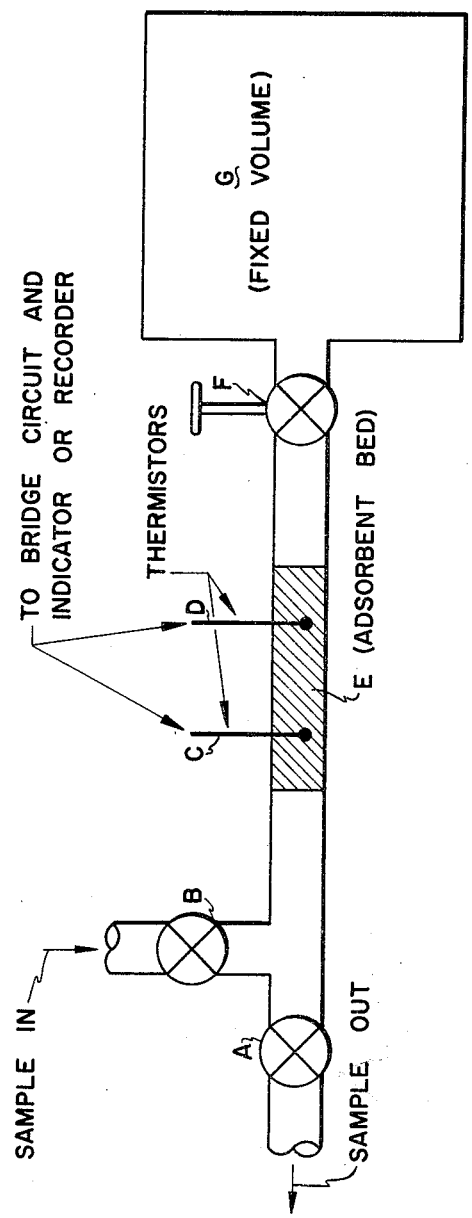
Harry M. Crawford    Inventor
By Richard N. Nagel
Patent Attorney 3,167,947
GAS DETECTOR AND ANALYZER
Harry M. Crawford, Point Murray, N.J., assignor to Esso Research and Engineering Company, a corporation of Delaware
Filed Aug. 7, 1961, Ser. No. 129,659
9 Claims. (Cl. 73—23.1)

This invention relates to a new detection and measurement technique. More specifically, this invention teaches the application of differential absorption or solubility phenomenon to separate, detect and measure one or more components of a gaseous mixture.

The measurement and detection of one or more trace components in gaseous mixtures is of great importance in the chemical and petroleum industries. It is particularly necessary to be able to rapidly detect and measure the concentration of components in samples so as to maintain product quality and make proper adjustments in processes before harmful results occur.

The instant invention has many advantages over hitherto used detection apparatus. For example, when gas chromatography is used to detect moisture, there is a definite lack of sensitivity when measuring low moisture contents in the parts per million range. In addition, bottled gas is needed to act as a carrier and generally the apparatus is quite costly, ranging from four to six thousand dollars for plant-type equipment. Electrolytic type moisture analyzers also suffer from disadvantages, namely, they foul when unsaturated hydrocarbons are present, recombination errors result, there are sever range limitations, and they have a high service factor since the cells are readily fouled with foreign matter. Conventional adsorption moisture analyzers have a disadvantage of being of extremely high cost, that is, in the range of nine thousand dollars. Additionally, they create polymerization problems with unsaturates and require complicated readout systems.

In accordance with the instant invention, it has been found that by applying differential adsorption and/or solubility phenomenon, one or more trace components of a gaseous mixtue may be readily detected and measured. Briefly, this technique involve the use of the pressure cycling of a sample so that it may serve to regenerate the detecting means. Where adsorption phenomenon is used, advantage is taken of the heat of adsorption liberated when one or more components of a gas mixture stream are selectively adsorbed on an adsorbent. Since the temperature rise is directly proportional to the amount of heat adsorbed and since the heat of adsorption of particular materials on particular adsorbents is well known, it is possible to correlate the temperature rise with the amount of material present in a fixed quantity gas. In order to regenerate the adsorbent, the absorption effluent is backflowed over the adsorbent material at a reduced pressure. By so doing, the adsorbed material is purged from the adsorbent, thereby readying the adsorbent for subsequent use.

To more fully illustrate the instant invention, attention is directed to the attached figure. An adsorbent bed E is located within an adsorption zone and provided with a sample inlet conduit wherein is located valve B and a sample outlet conduit wherein is located valve A. The far end of the adsorbent bed E is connected to fixed volume trap G. Intermediate to the adsorbent bed E and the fixed volume trap G is valve F. Thermistors C and D are located respectively in the forward and rear ends of the bed. They are connected to a bridge circuit and indicator or recorder (not shown). In the operation of the analyzer, a sample containing moist air is admitted through valve B into the adsorbent bed E. At this time, valve A is closed. The sample is allowed to flow across the adsorbent bed into the fixed volume trap G for a fixed time or until the pressure in the fixed volume trap equals the pressure of the regulated sample. Only a predetermined amount of the gaseous material will flow across the adsorbent bed. During the flow of gas into the fixed volume trap, the pressure at E is above atmospheric because of the constriction created by the partially opened valve F. As the sample passes through the adsorbent bed E, moisture is adsorbed primarily in the vicinity of the thermistor C. This results in the evolution of heat. The adsorbent bed E is selected so as to be of a sufficient size so that moisture does not break through to the vicinity of D. Thus, the thermistor D serves as a reference thermistor. The differential heating which results, as noted above, is measured by a conventional bridge circuit. After the temperature differential measurement is made, valve B is closed and valve A opened to a lower or atmospheric pressure region. Gas from the fixed volume trap G then flows in a reverse direction over the bed E at a lower pressure. The moisture previously adsorbed in the vicinity of thermistor C is now totally desorbed. This desorption results in the cooling of the desiccant in the vicinity of C and substantially restores the adsorbent bed to a uniform temperature. Both the heats of adsorption and desorption may be related directly to the moisture content of the sample.

While the above description employs an adsorbent bed to detect the moisture, it is equally within the scope of this invention to utilize a liquid substrate which will partition one or more of the components of the gaseous mixture. The heat of solution may be measured in a manner analogous to that described above. The adsorbed which is used will, of course, depend upon the component or components to be analyzed. For example, where it is desired to measure moisture, an adsorbent such as silica gel can be advantageously used.

Other examples of samples which may be analyzed include moisture in saturated and unsaturated hydrocarbons and inert gas streams with Dowex ion exchange resin, the detection of carbon dioxide with activated alumina, and the detection of oxygen with molecular sieves. Hydrocarbons in hydrogen may also be detected by using activated alumina or charcoal as the adsorber. In fractionating towers, the overhead product may be analyzed by using 5A molecular sieves or alumina to detect normal butane.

The size of the adsorbent bed or substrate must be selected so that none of the adsorbed component appears in the far end of the bed. Determination of the geometric shape and weight of adsorbent is shown by the following sample calculation:

(1) Select geometry of trap. For convenience, trap should be kept small as possible so as to make the whole apparatus compact and reduce load of thermostated models.

(2) Select operating pressure. Low pressure is advantageous since it allows the measurement of high dew point gases.

(3) Calculate volume of gas to be dried=volume at conditions of sample (operating pressure)=volume at reduced pressure.

(4) For given moisture range calculate weight of desiccant required for 100% adsorption.

*Example.*—Activated alumina can adsorb water at 100% efficiency until weight of water adsorbed equals 12% of the weight of alumina.

(5) From (3) and (4) weight of desiccant can be calculated using published data and following simple procedures used in sizing commercial driers.

(6) Bed geometry should be such as to promote piston flow (no channeling). L/D ratio should be 4:1 or greater.

(7) The measuring thermistor C should be located such that for a given range all moisture is adsorbed at or prior to C as the gas passes into G. The amount of desiccant calculated in step (5) should be placed in bed 6 prior to C.

(8) Reference detector D can be placed deeper in the same bed. A distance twice that of C gives a safety factor of 2. However, this distance should be kept small since the bed between C and D has some finite heat capacity. Heat capacity between C and D can give raised temperature differentials in unthermostated models even though no moisture is present. It is conceivable that D can be located out of the bed and prior to C if this is found to present a problem.

The adsorption pressure is determined by the pressure at which the sample is introduced and by the constriction of the valve between the adsorbent bed and the fixed volume trap.

In normal operation valve F is utilized as a fixed orifice. Its purpose is to hold the bed above atmospheric pressure during the adsorption cycle (i.e. during the flow of gas into G). The desiccant, therefore, comes to equilibrium with the adsorbed water at a positive pressure. Also at this elevated pressure the piston flow of a moisture front is less than a given volume of gas at standard temperature and pressure.

During the purge portion of the cycle, the fixed orifice F reduces the pressure of the gas in G and now an environment (reduced pressure) is created in which the desiccant must give up the previously adsorbed moisture to reach equilibrium. At this reduced pressure, the piston flow is greater due to the expension of the gas from G.

Although a fixed orifice can be used, the use of a needle valve is convenient since it can be easily adjusted (measure rise time of pressure in G with stop watch and pressure gauge). Also, for a given cycle time, the amount of sample (hence, the range of the instrument) can be changed if needed by simple adjustment of the valve.

The desorption pressure, that is, the pressure over the adsorbent during the backflowing part of the cycle, is preferably atmospheric. This is convenient since it permits simple venting of the sample. However, under some circumstances, it might be desirable to desorb at subatmospheric pressures. For example, if the gas to be analyzed liquefies at high pressures, it may be necessary to use lower adsorption pressures and to desorb under a vacuum. In addition, when there is a large amount of adsorbed component, say, over 20%, vacuum desorption may be necessary to completely regenerate the adsorbent.

Many modifications of the instant invention may be made without departing from its spirit. For example, instead of using thermistors, pressure gauges may be employed in certain applications. Since adsorption of a particular component will reduce the amount of material in the gas phase, the pressure in the chamber may be correlated with the amount of adsorption. When this technique is used, a fixed volume of sample is passed over the bed. This fixed volume is preferably trapped at a positively controlled pressure before passage over the adsorbent bed. Where it is desirable to detect more than one component, different adsorbents may be used in tandem. For example, Dowex may be used to detect water, followed by activated alumina for the detection of carbon dioxide, followed by the use of molecular sieves for the detection of oxygen. In this case, the amount of sample may be conveniently regulated by determining the pressure in the trap. Basically, the same flow scheme as described in the above figure would be employed. The main difference would be in the length of the column which, like in chromatography, must be picked for the separation required. For continuity in the carrier gas, the pressure in the trap should be held to the same value on pressurizing. It may be advantageous to use a pressure switch on the trap as a means of regulating cycle time.

In addition to thermistors, it would be obvious to one skilled in the art that thermocouples, thermopiles, thermoconductivity instruments, and other detectors known in the field of gas chromatography may be employed in the instant invention.

To more fully illustrate the instant invention, the following example is set forth.

*Example 1*

Using the apparatus similar to that shown in the attached figure, samples of air with known moisture content were analyzed. The adsorbent, Dowex ion exchange resin, was placed in a spring loaded adsorption zone having an inside diameter of about 0.34 inch and a length of 3 inches. Matched thermistors (VECO #A156) were located ¼ inch and 1½ inches from the sample inlet end of the adsorbent bed. These thermistors were wired to a conventional bridge circuit which, in turn, was connected to a recorder having a range of from $-1.25$ to $+1.25$ millivolts. The fixed volume trap was made up of 90 inches of ¼ inch O.D. copper tubing. A precision needle valve (NUPRO) served as value F and a three-way air-operated valve (Humphrey model 125A) served to control the introduction and exhausting of the sample. The sample inlet pressure was 8 p.s.i.g. and the exhaust pressure was atmospheric. Cycle time was regulated by an electrical timer (Industrial Timer Corporation, Model CM-0) to 24 cycles per minute. Using air with known moisture content, it was found that there was 1.0 millivolt deflection for each 100 p.p.m. of water by volume and, furthermore, the response was linear.

What is claimed is:

1. An improved autoregenerating gas analyzer which comprises: an adsorption zone containing adsorbent material; a sample inlet means connected to one end of said adsorption zone; a fixed volume trap; a conduit connecting said trap to the other end of said adsorption zone; a pressure reducing means in said conduit; a sample outlet means connected to said one end of said adsorption zone; valve means for permitting a gaseous sample to alternately flow into said sample inlet means and outwardly through said sample outlet means; temperature sensitive means in both said ends of said adsorption zone for detecting a temperature differential between said one end and said other end of said adsorption zone.

2. The improved gas analyzer of claim 1 wherein said pressure reducing means is a valve.

3. The improved gas analyzer of claim 1 wherein said pressure reducing means is an orifice.

4. The improved gas analyzer of claim 1 wherein said temperature sensitive means are thermistors.

5. The improved gas analyzer of claim 1 wherein the said adsorbent material is an ion exchange resin.

6. An improved process for analyzing a key component of a gaseous mixture which comprises: introducing said gaseous mixture into an adsorbent zone containing an adsorbent selective of said key component in a positive flow direction at a relatively high pressure during an adsorption step, said adsorbent being initially substantially free of said key component and comprised of two portions, a forward portion, said portion comprising the area in which the said key component is totally adsorbed, and a rear portion, the said rear portion comprising the rest of the said adsorbent zone, adsorbing said key component on the said forward portion of said adsorbent; discontinuing the introduction of said gaseous material prior to the absorption of said key component on the said rear portion of said adsorbent; concurrently detecting the temperature differential between said front and said rear portions of the said adsorbent zone thereby determining the amount of said key component present in said gaseous mixture, thereby terminating said adsorption step; withdrawing an effluent substantially free of said key component from said adsorption zone; concurrently reducing the pressure of said effluent; collecting said reduced pressure effluent; reducing the pressure in said adsorption zone and then backflowing therethrough said collected effluent, thereby desorbing said key component from said adsorbent; withdrawing a second effluent from said adsorption zone, said second effluent having substantially the same composition as said gaseous mixture.

7. The process of claim 6 wherein said key component is water and said gaseous mixture is moist air.

8. The process of claim 6 wherein said adsorbent is an ion exchange resin.

9. The process of claim 6 wherein said temperature differential is detected by means of thermistors located in said forward and rear portions of said adsorbent.

References Cited in the file of this patent

UNITED STATES PATENTS

| | | |
|---|---|---|
| 2,935,867 | Christensen | May 10, 1960 |
| 3,011,335 | Skarstrom | Dec. 5, 1961 |